(12) United States Patent
McGregor et al.

(10) Patent No.: US 6,374,343 B1
(45) Date of Patent: *Apr. 16, 2002

(54) ARRAY INDEXING WITH SEQUENTIAL ADDRESS GENERATOR FOR A MULTI-DIMENSIONAL ARRAY HAVING FIXED ADDRESS INDICES

(75) Inventors: Douglas Robert McGregor; William Paul Cockshott, both of Glasgow (GB)

(73) Assignee: University of Strathclyde, Glasgow (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,156
(22) PCT Filed: Mar. 19, 1997
(86) PCT No.: PCT/GB97/00764
§ 371 Date: Oct. 28, 1998
§ 102(e) Date: Oct. 28, 1998
(87) PCT Pub. No.: WO97/35256
PCT Pub. Date: Sep. 25, 1997

(30) Foreign Application Priority Data
Mar. 20, 1996 (GB) ............................................. 9605853

(51) Int. Cl.[7] .............................................. G06F 12/00
(52) U.S. Cl. .................. 711/217; 711/200; 711/209
(58) Field of Search ................................. 711/217, 202, 711/209, 200, 204

(56) References Cited

U.S. PATENT DOCUMENTS 4,819,152 A * 4/1989 Deerfield et al. ............ 711/217
5,293,596 A * 3/1994 Toyokura et al. ............... 711/1
5,586,256 A * 12/1996 Thiel et al. .................. 710/100

FOREIGN PATENT DOCUMENTS

EP 443 551 A2 8/1991

OTHER PUBLICATIONS

Proceedings of the Asilomar Conference on Signals, Systems and Computers Oct. 30–Nov. 1, 1989 vol. 1 of 2 Oct. 30, 1989 Chen R R. pp. 2–6 Sprinivasan et al. "A Novel addressing scheme for two dimensional data access in digital siganl processors".*

Proceedings Of The Asilomar Conference On Signals, Systems & Computers, vol. 1 of 2, Oct. 30–Nov. 1, 1989, "A Novel Addressing Scheme For Two Dimensional Data Access In Digital Signal Processors", Srinivasan et al, pp. 2–6.

Patent Abstract of Japan, Publication No. 03 139718, Jun. 13, 1991, "N–Bit Arithmetic Operation Circuit".

* cited by examiner

Primary Examiner—Tuan V. Thai
(74) Attorney, Agent, or Firm—Alston & Bird LLP

(57) ABSTRACT

A method and apparatus for sequentially generating a set of addresses, defined over a plurality of indices, for a multi-dimensional array stored in a memory for the condition where at least one of the address indices is fixed, is performed by simple addition, OR-ing and AND-ing. An accumulator or counter initially holds an arbitrary binary value composed of a set of binary indices corresponding to the address indices. This binary value is logically OR-ed with a first mask value having binary indices selected in value in relation to the fixed address indices. The resultant is logically AND-ed with a second mask value having binary indices selected in value in relation to the fixed address indices, and this operation produces a first address of the set. The same resultant is incremented and the incremented value is delivered to the accumulator for the cycle to be repeated.

5 Claims, 2 Drawing Sheets

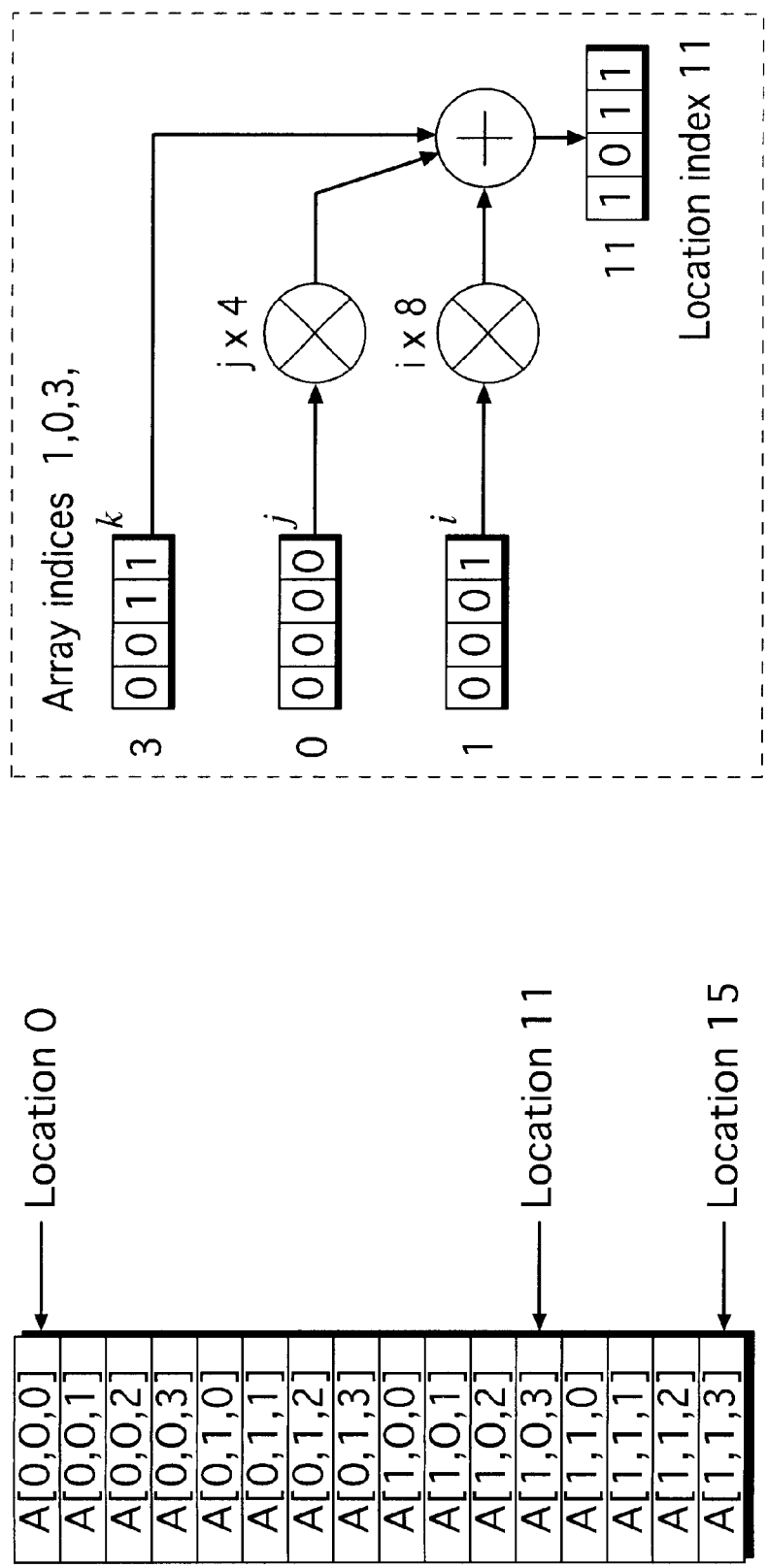

ARRAY INDEXING WITH SEQUENTIAL ADDRESS GENERATOR FOR A MULTI-DIMENSIONAL ARRAY HAVING FIXED ADDRESS INDICES

The present invention relates to array indexing in a computer and in particular to a method of and apparatus for sequentially generating a set of addresses, defined over a plurality of indices, for a multi-dimensional array scored in a memory, wherein at least one of the address indices is fixed.

In accessing data stored in a digital memory, it is often desirable or necessary to step through the entries of a multi-dimensional array, holding one or more indices of the address constant whilst doing so. To illustrate this, reference is made to FIG. 1 which shows a typical example of how a multi-dimensional array A[i,j,k] where i=0 to 1, j=0 to 1, k=0 to 3 may be stored in a computer's memory. The array is logically a sequence of elements each of which is identified with a unique combination of subscripts or indices (i,j,k) but is physically stored in a one dimensional array of locations in the memory. In order to enable hardware to access the one dimensional memory array it is necessary to translate logical addresses composed of the appropriate indices (i,j,k) to location addresses which can directly access the one dimensional array.

It is therefore the case that associated with each set of indices in the multidimensional array there will be a number which, when used as an index to the underlying one dimensional array, will define the corresponding position in the one dimensional array. Thus, in the example shown in FIG. 1, element A[1,0,3] will be in decimal location 11 (i.e. 1011 in binary) in the underlying one dimensional array.

In the above example, location 11 is typically obtained from che array indices [1,0,3] as shown in FIG. 2. The indices [1,0,3] i.e. i,j, are held in respective distinct registers (i,j,k) and are then multiplied by appropriate constants (8, 4 and 1). The results are then added together to form the location number (1011) in binary.

Consider now that one wishes to step through the array A[i,j,k], holding the value of j constant at 1 but going through all legitimate combinations of i and k. This involves accessing the set of array elements:

A[0,1,0], A[0,1,1], A[0,1,2], A[0,1,3],
A[1,1,0], A[1,1,1], A[1,1,2], A[1,1,3]
and the corresponding locations: 4,5,6,7,12,13,14,15

The normal process by which this would be done would be to:

1. reserve three computer registers for i, j, k;
2. initialise them to the values i=0, j=1, k=0;
3. set up a pair of nested loops in a computer program so that
    (a) the outer loop increments i through all its allowed values
    (b) the inner loop increments k through all its allowed values and
    (c) the kernel of the inner loop uses the process shown in FIG. 2 to compute the location numbers from the indices of each array element.

The disadvantage of this process is that it involves multiplication or shift operations and nested loops, all of which are relatively slow operations to perform using computer hardware.

It is an object of the present invention to overcome or at least mitigate the above mentioned disadvantages of array address generating methods.

According to a first aspect of the present invention there is provided a method of sequentially generating a set of addresses, defined over a plurality of indices. for a multi-dimensional array stored in a memory, wherein at least one of the address indices is fixed at an actual value, the method comprising the steps of:

(a) providing a first binary address having address indices of arbitrary value;
(b) replacing all of the bit values of each fixed index in the first binary address with 1.'s;
(c) incrementing the resulting binary value, wherein any carry values(s) generated propagate(s) across each fixed index;
(d) replacing the bit values of each fixed index in the resulting binary value with the actual values to which each fixed index is set to provide a first address for the set; and
(e) repeating steps (b) to (d), using the preceding result of step (c) as a new first binary address value, until the required address set has been generated.

In an embodiment of the above first aspect of the invention, the method comprises the steps of:

(i) providing an accumulator and storing in the accumulator a binary value composed of a set of binary indices corresponding to the address indices;
(ii) performing a logical OR operation between the binary value stored in the accumulator and a first mask binary value, where the first mask, value is also composed of a set of binary indices with each index, corresponding to each fixed address index, being composed entirely of 1's and the other indices being composed entirely of 0's;
(iii) performing a logical ANT operation between the result of the OR operation in step (ii) and a second mask binary value composed of a set of binary indices, where each index, corresponding to each fixed address index, contains the corresponding binary value of the fixed address index, and the other indices are composed entirely of 1's, wherein the result of the AND operation provides a first address for the set;
(iv) incrementing the result of the OR operation performed in step (ii) and storing the result in the accumulator; and
(v) repeating steps (ii) to (iv) until the required address set has been generated.

The present invention makes it possible, by suitable use of mask bits, to so arrange the inputs to a conventional computer adder that the operations required to step through a multi-dimensional array can be performed by simple addition, ORing and ANDing.

The binary value initially stored in the accumulator may be any arbitrary value although it would normally be initialised to zero.

According to a second aspect of the present invention there is provided a digital computer memory comprising at least one digital data storage device and address generating means arranged to generate addresses according to the method of the above first aspect of the present invention for the purpose of accessing data stored in the or each data storage device.

According to a third aspect of the present invention there is provided apparatus for carrying out the method of the above first aspect of the invention and comprising:

a first register arranged to provide said accumulator;
a second register arranged to store the first mask binary value;

an OR logic unit coupled to said first and second registers for performing the OR operation of step (ii);

a third register coupled to the OR unit and arranged to store the result of said OR operation;

an incrementing unit coupled to said first and third registers and arranged to perform step (iv);

a fourth register arranged to store said second mask value; and an AND logic unit coupled to said third and fourth registers and arranged to perform the AND operation of step (iii).

For a better understanding of the present invention and in order to show how the same may be carried into effect reference will now be made, by way of example, to the accompanying drawings, in which:

FIG. 1 illustrates the mapping of a logical 3-dimensional array onto a physical 1-dimensional memory space;

FIG. 2 shows schematically a conventional process for generating the location in the 1-dimensional memory space of FIG. 1 corresponding to a 3-dimensional array address;

Considering the array A shown in FIG. 1, instead of maintaining three registers (as per FIG. 2) corresponding to the dimensions of the array to be traversed, an embodiment of the present invention requires (as per FIG. 3) only a single counting register C and two mask words, p and q. The following steps are then followed:

1. a boolean OR operation is performed between the contents of register C and the mask word p;
2. the result of the first step is then incremented and returned to register C;
3. the mask q is 'ANDed' with the result of the first step and the result used as the location (in binary) of the current array element, For this technique to work, the mask words p, q must be prepared so that p holds 1's in the positions corresponding to the dimensions of the array that are being held fixed and 0's elsewhere, whilst the mask q contains:

1's in the positions corresponding to the dimensions of the array chat are being stepped through;

a pattern of 1's and 0's in the positions corresponding to the dimensions of the array that are fixed, so that the patterns of 1's and 0's correspond to the appropriately multiplied constant indices of these dimensions;

the value 0 in all other bit positions.

The effect of the 'ORing' with p is to create a number with strings of 1's between the fields that correspond to the dimensions being stepped through. These strings of 1's have the effect of allowing carry bits to propagate through them to the fields in the words corresponding to the next varying dimension.

Figure 3:
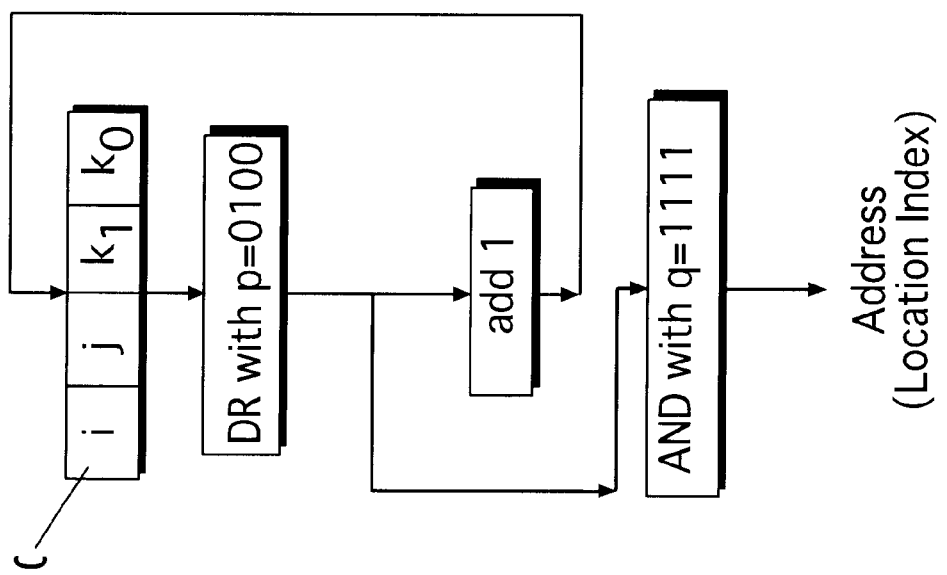
FIG. 3 shows a flow diagram illustrating the generation of multi-dimensional array addresses according to an embodiment of the invention.

As is illustrated in FIG. 3 the register C is a four-bit register with the two least significant bits holding index k (where k=0 to 3) and the two most significant bits holding indices i and j (where i, j=0 to 1) and it is required to step through all possible addresses with j held constant at 1. The register C is is initialised to 0000, or any other suitable value, before commencing address generation by applying steps 1, 2 and 3 above, whilst the mask words p and q are set to 0100 and 1111 respectively.

Figure 4:
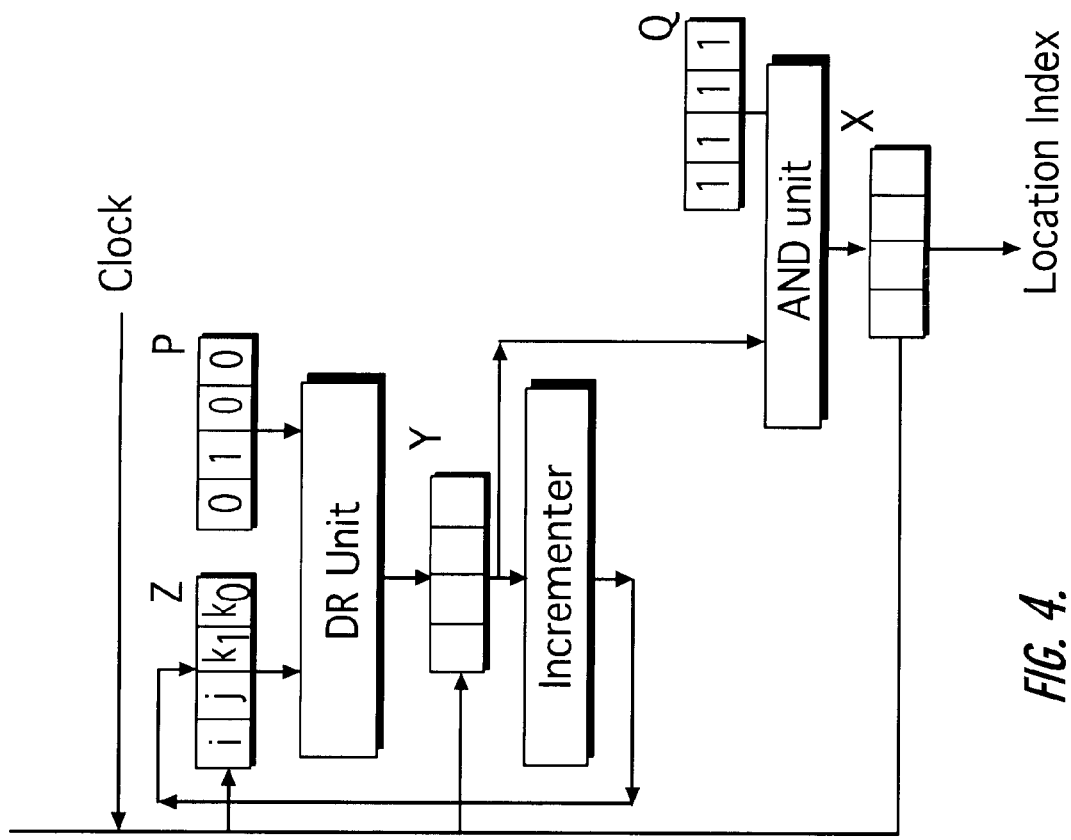
FIG. 4 shows schematically a system for carrying out the process of FIG. 3.

One possible implementation of this technique, suitable for high speed computers, is shown in FIG. 4. The apparatus contains three registers X,Y,Z that are loaded with new data every clock cycle. For reasons of simplicity all registers are shown having 4 bits (2 bits allocated to the first, least significant index k, and 1 bit allocated to each of the other two indices i, j), but the technique applies equally well to longer or shorter registers. During each clock cycle, the apparatus will store in register X the address (in binary) of the next location in the 3-dimensional array to be accessed.

Two auxiliary registers P, Q are loaded at the start of the process with the masks p, q described above. Each cycle, register Y is loaded with the result of 'ORing' the contents of registers Z and P, and register Z is subsequently loaded with [1+Z], Register X is loaded with the result of 'ANDing' the consents of registers Y and Q. Thus, without any circuitry more complex than an incrementer, a new array location (in binary) can be computed each cycle.

An alternative software implementation involves executing a simple loop on a conventional computer processor such as is set out, for example, below. Assume in what follows that register SI holds the mask p, register DX holds the mask q and that register CX holds a count of the number of elements to visit.

```
start: and AX, DX      ; location now in AX
       call uselocation ; use the location to fetch and
                         operate on the array element
       mov AX, BX      ; recover previous value
                         with propagate bits
       inc AX          ; increment propagating the carries
       or AX, SI       ; set the propagate bits again
       mov BX, AX      ; save in BX
       loop start      ; decrement CX and jump to start
                         in nonzero
```

Again the loop requires no slow multiply or shift instructions, and only a single loop is required, The embodiment described above is generally applicable to arrays having array indices each of which extends from 0 to $2^{n-1}$. This enables the generation of a carry bit, for propagation to the next variable index, when the maximum value in the preceding variable index is exceeded.

What is claimed is:

1. A method of accessing entries of a multi-dimensional data array which is stored in a one-dimensional array of locations in a digital memory, where each entry of the multi-dimensional data array is identified by a logical address formed by a unique combination of indices which define the multi-dimensions of the data array, and where each corresponding location of the location array is identified by a location address which corresponds to a binary translation of relevant logical address, and wherein the method comprises stepping through the entries of the multi-dimensional data array while holding constant one or more indices of the addresses to access the corresponding sub-set of entries of the data array by producing the corresponding sub-set of sequentially generated location addresses, said method comprising the steps of:

(a) providing a first logical address having indices of arbitrary value, said first logical address being in binary and forming a first binary word;

(b) replacing with 1's the binary bit values of the first binary word which correspond to the indices being held constant, so as to form a second binary word;

(c) incrementing the second binary word established by step (b) so as to form a third binary word;

(d) replacing in the third binary word established by step (c) the bit values which were set to 1's in step (b) with the actual binary values of the indices being held constant, so as to provide a fourth binary word which corresponds to a first location address in the sub-set of location addresses; and (e) repeating steps (b) and (d) using the preceding result of step (c) as a new first binary word until the required sub-set of location addresses has been generated.

2. A method of accessing entries of a multi-dimensional data array which is stored in a one-dimensional array of locations in a digital memory, where each entry of the multi-dimensional data array is identified by a logical address formed by a unique combination of indices which define the multi-dimensions of the data array, and where each corresponding location of the location array is identified by a location address which corresponds to a binary translation of relevant logical address, and wherein the method comprises stepping through the entries of the multi-dimensional data array while holding constant one or more indices of the addresses to access the corresponding sub-set of entries of the data array by producing the corresponding sub-set of sequentially generated location addresses, said method comprising the steps of:

(i) providing an accumulator and storing in the accumulator a binary value composed of a set of binary indices corresponding to the address indices;

(ii) performing a logical OR operation between the binary value stored in the accumulator and a first mask binary value, where the first mask value is also composed of a set of binary indices with each index, corresponding to each fixed address index, being composed entirely of 1's and the other indices being composed entirely of 0's;

(iii) performing a logical AND operation between the result of the OR operation in step (ii) and a second mask binary value composed of a set of binary indices, where each index, corresponding to each fixed address index, contains the corresponding binary value of the fixed address index, and the other indices are composed entirely of 1's, wherein the result of the AND operation provides a first address for the set;

(iv) incrementing the result of the OR operation performed in step (ii) and storing the result in the accumulator; and (v) repeating steps (ii) to (iv) until the required address set has been generated.

3. A method as claimed in claim 2, wherein the binary value initially stored in the accumulator is any arbitrary value.

4. A method as claimed in claim 3, wherein the arbitrary value is zero.

5. Apparatus for carrying out a method of accessing entries of a multi-dimensional data array which is stored in a one-dimensional array of locations in a digital memory, where each entry of the multi-dimensional data array is identified by a logical address formed by a unique combination of indices which define the multi-dimensions of the data array, and where each corresponding location of the location array is identified by a location address which corresponds to a binary translation of relevant logical address, and wherein the method comprises stepping through the entries of the multi-dimensional data array while holding constant one or more indices of the addresses to access the corresponding sub-set of entries of the data array by producing the corresponding sub-set of sequentially generated location addresses, said apparatus comprising:

a first register arranged to provide an accumulator for storing a binary value composed of a set of binary indices corresponding to the address indices;

a second register arranged to store the first mask binary value;

an OR logic unit coupled to said first and second registers for performing a logical OR operation;

a third register coupled to the OR unit and arranged to store the result of said OR operation;

an incrementing unit coupled to said first and third registers and arranged to increment the result of the OR operation and to store the result in the first register;

a fourth register arranged to store said second mask value; and an AND logic unit coupled to said third and fourth registers and arranged to perform a logical AND operation between the result of the OR operation stored in the third register and the second mask value stored in the fourth register.

* * * * *